United States Patent
Dumov et al.

(10) Patent No.: US 10,108,435 B2
(45) Date of Patent: Oct. 23, 2018

(54) SHORT MESSAGE SERVICE SECURITY FOR ZERO TOUCH DEPLOYMENTS

(71) Applicant: Cisco Technology, Inc., San Jose, CA (US)

(72) Inventors: Leo Dumov, Los Gatos, CA (US); Andrew Persaud, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 156 days.

(21) Appl. No.: 15/208,050

(22) Filed: Jul. 12, 2016

(65) Prior Publication Data

US 2018/0018184 A1    Jan. 18, 2018

(51) Int. Cl.
| | |
|---|---|
| *G06F 15/177* | (2006.01) |
| *G06F 9/00* | (2006.01) |
| *G06F 9/24* | (2006.01) |
| *G06F 9/4401* | (2018.01) |
| *H04L 12/24* | (2006.01) |
| *H04W 4/14* | (2009.01) |
| *H04L 29/06* | (2006.01) |
| *H04W 12/04* | (2009.01) |
| *H04W 84/04* | (2009.01) |

(52) U.S. Cl.
CPC ........ *G06F 9/4416* (2013.01); *H04L 41/0806* (2013.01); *H04L 63/0428* (2013.01); *H04L 63/0492* (2013.01); *H04W 4/14* (2013.01); *H04W 12/04* (2013.01); *H04W 84/042* (2013.01)

(58) Field of Classification Search
CPC ............... G06F 9/4416; H04L 41/0806; H04L 63/0428; H04L 63/0492; H04W 4/14; H04W 12/04; H04W 84/042
See application file for complete search history.

(56) References Cited

U.S. PATENT DOCUMENTS

| | | | |
|---|---|---|---|
| 7,039,708 B1 * | 5/2006 | Knobl | B60R 25/04 709/203 |
| 7,420,933 B2 | 9/2008 | Booth, III et al. | |
| 8,161,540 B2 | 4/2012 | Mantripragada et al. | |
| 8,255,677 B2 * | 8/2012 | Venkatachalam | H04L 12/66 713/1 |
| 8,763,084 B2 | 6/2014 | Mower et al. | |
| 2006/0058024 A1 * | 3/2006 | Manner | G06F 17/30174 455/432.3 |

(Continued)

*Primary Examiner* — Xuxing Chen
(74) *Attorney, Agent, or Firm* — Edell, Shapiro & Finnan, LLC (57) ABSTRACT

Presented herein are techniques for enabling the zero touch deployment of devices having an integrated wireless wide area network (WWAN) interface. In one example, a method includes initializing a device with a WWAN interface such that the device attaches to a WWAN, receiving, via the WWAN interface of the device, a data message that includes encrypted bootstrap configuration information, obtaining a key stored in a subscriber identification module (SIM) card of the WWAN interface, decrypting the encrypted bootstrap configuration information using the key, establishing communication with a remote server using the bootstrap configuration information and obtaining configuration data from the remote server, and performing self-configuration of the device using the configuration data.

20 Claims, 7 Drawing Sheets

(56) References Cited

U.S. PATENT DOCUMENTS

| | | |
|---|---|---|
| 2010/0056104 A1 | 3/2010 | Butler et al. |
| 2010/0261467 A1 | 10/2010 | Chou et al. |
| 2013/0103807 A1 | 4/2013 | Couto et al. |
| 2013/0267199 A1* | 10/2013 | Kamal ................ H04L 63/0853 455/410 |
| 2014/0122674 A1 | 5/2014 | Gray et al. |
| 2015/0003282 A1 | 1/2015 | Gourlay et al. |

* cited by examiner

SHORT MESSAGE SERVICE SECURITY FOR ZERO TOUCH DEPLOYMENTS

TECHNICAL FIELD

The present disclosure relates to communication devices with wireless wide area network interfaces.

BACKGROUND

Mobile broadband routers, sometimes referred to herein simply as "mobile routers" or "routers," are wireless network access devices that provide access to the Internet as an alternative to, for example, cable, digital subscriber line (DSL), and other wired services that may not be available in a location or are costly. A mobile router operates by tuning into a wireless wide area network (WWAN), such as a third generation (3G), a fourth generation (4G), or other type of cellular network. A mobile router may communicate with local wireless computing devices using a wireless local area network (WLAN) technology, such as one of the Institute of Electrical and Electronics Engineers' (IEEE) 802.11 standards. Wireless computing devices may include, for example, laptop computers, desktop computers, tablet computers, mobile phones, etc. that have wireless networking capabilities.

Before a router can be fully operational, the router must be configured with routing tables, policies, security information, and other relevant configuration data. A router manufacturer or vendor has historically configured a router for its intended usage prior to shipment to an end user. Alternatively, the router is configured by the end-user in the field.

DESCRIPTION OF EXAMPLE EMBODIMENTS

Overview

Presented herein are techniques for enabling the zero touch deployment of devices having an integrated wireless wide area network (WWAN) interface. In one example, a method includes initializing a device with a WWAN interface such that the device attaches to a WWAN, receiving, via the WWAN interface of the device, a data message that includes encrypted bootstrap configuration information, obtaining a key stored in a subscriber identification module (SIM) card of the WWAN interface, decrypting the encrypted bootstrap configuration information using the key, establishing communication with a remote server using the bootstrap configuration information and obtaining configuration data from the remote server, and performing self-configuration of the device using the configuration data.

In another example, a device is provided. The device includes a wireless wide area network (WWAN) interface, a memory, and a processor coupled to the memory and configured to: initialize the device with the WWAN interface such that the device attaches to a WWAN, receive, via the WWAN interface, a data message that includes encrypted bootstrap configuration information, obtain a key stored in a subscriber identification module (SIM) card of the WWAN interface, decrypt the encrypted bootstrap configuration information using the key, establish communication with a remote server using the bootstrap configuration information and obtain configuration data from the remote server, and perform self-configuration of the device using the configuration data.

Example Embodiments

In general, zero touch deployment (ZTD) refers to the ability to configure (i.e., set up) a device without the need for an administrator to log into and manually configure the device and without any initial configuration at the device. Presented herein are zero touch deployment techniques that make use of a wireless wide area network, such as a cellular network, to provide a device with appropriate configuration information once the device authenticates to a far end server. For ease of illustration, the zero touch deployment techniques presented herein are described with reference to a particular device, namely a mobile router. The mobile router in the examples presented herein is connected to a specific wireless wide area network, namely a cellular network. However, it is to be appreciated that the ZTD techniques presented herein may be used with other devices having wireless wide area network communication capabilities.

The techniques described herein utilize a cellular wide area network (WAN) modem that is provided with a mobile router. Such a modem is provided with a subscriber identity module (SIM) card that can be configured not only by a cellular service provider, but also by an end user. For example, the SIM card includes an accessible memory area that includes a "phone book" feature that allows an end user to store phone numbers and as well as other data. In the case of one implementation of the ZTD of the present embodiments, an encryption key is stored in the SIM card phone book, although the encryption key may be stored in other parts of the memory of the SIM card. In accordance with the described techniques, the short message service (SMS) is used to send encrypted bootstrap configuration information to the mobile router via the modem that enables the mobile router to contact a far end server to obtain appropriate configuration data to enable the mobile router to operate. The bootstrap configuration information is decrypted using the key stored in the phone book.

Features of the described embodiments include approaches to secure the bootstrap configuration information within the sent SMS message (which is sent in the clear) so that a target system (e.g., the mobile router) will be protected from unauthorized ZTD attempts.

One particular benefit of the approaches described herein is that not only can a mobile router manufacturer be responsible for generating and providing the configuration bootstrap information for a given mobile router, but an end user can also opt to control the content and delivery of the bootstrap configuration information.

The bootstrap configuration information itself may be sufficiently small to fit in a single SMS message (e.g., less than 140 bytes or 160 7-bits characters total). Thus, in one implementation, the bootstrap configuration information may comprise no more than, e.g., an IP address (i.e., the IP address of a remote far end server) and a one time password to enable an authenticated cellular data link and connection to the remote server, such as a Plug and Play (PnP) server or a software defined network (SDN) controller, either of which can then effectuate full manageability of the target platform. That is, once the mobile router connects to the PnP server or SDN controller (the remoter server), a PKI certificate authority or similar entity can take the target platform configuration to the next stage to complete system configuration and thereafter continue with management tasks. In another possible implementation, multiple SMS messages may be chained together to deliver the bootstrap configuration information. The techniques described herein are not limited to a single SMS message for delivery of the bootstrap configuration information.

Figure 1:
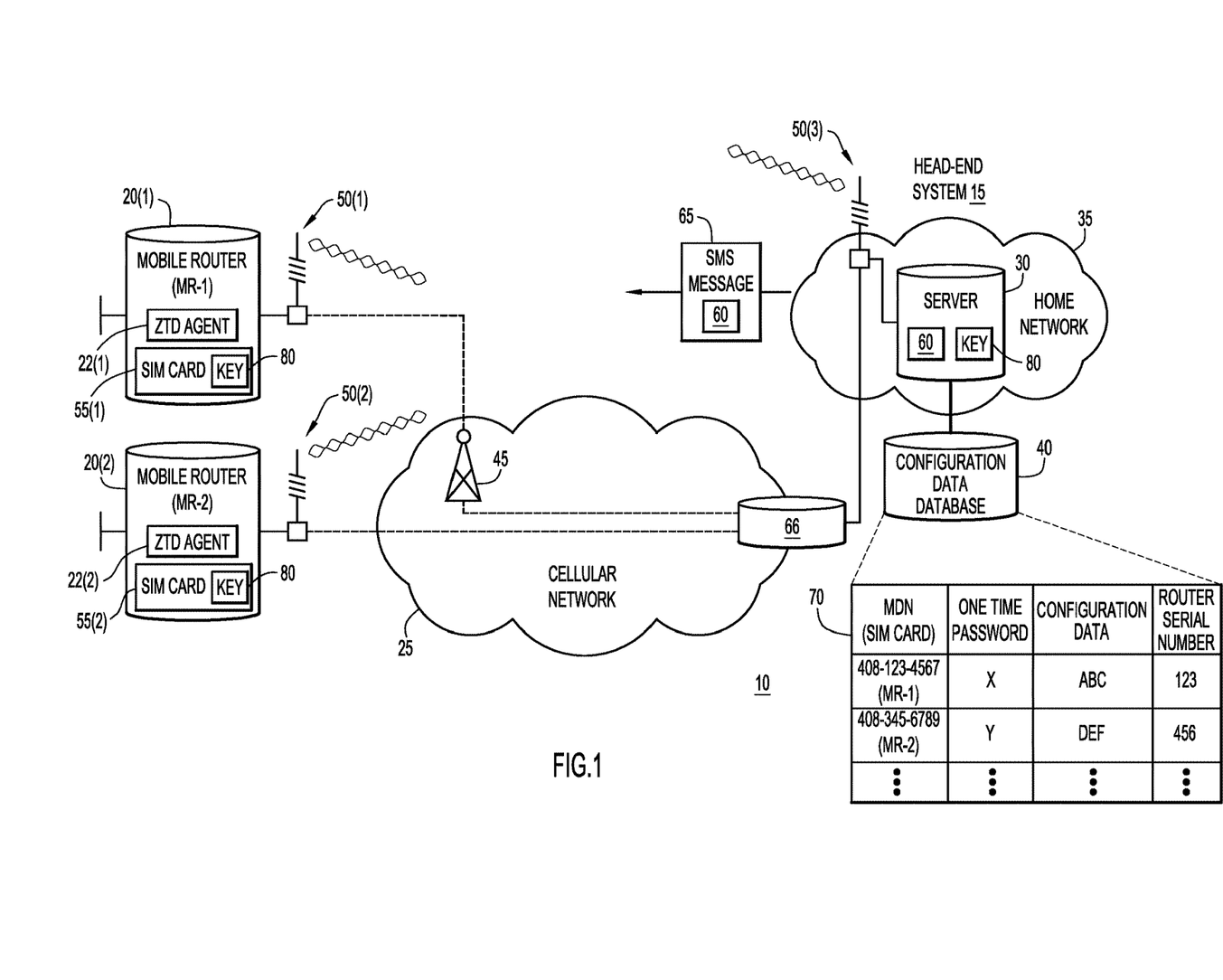
FIG. 1 is a schematic diagram of a system in which zero touch deployment techniques are deployed, in accordance with an example embodiment.

FIG. 1 is a schematic diagram of a system 10 in which zero touch deployment techniques in accordance with examples presented herein may be executed. In the example of FIG. 1, the system 10 includes a head-end system 15, two configurable mobile routers 20(1) and 20(2), and a wireless wide area network (e.g., cellular network) 25.

The mobile routers 20(1) and 20(2) each include a zero touch deployment agent 22(1) and 22(2), respectively. The head-end system 15 includes a server 30, a home network 35 (e.g., wired or wireless network), and a configuration data database 40. As described further below, the head-end system 15 is configured to send an SMS message to each of mobile routers 20(1) and 20(2) using the cellular network 25 to enable the mobile routers to connect to server 30 to thereafter obtain configuration data from configuration data database 40. The configuration data, which represent selected operating settings for each of the mobile routers 20(1) and 20(2), are used by the mobile routers 20(1) and 20(2) to perform self-configuration. This simplifies the deployment of the mobile routers 20(1) and 20(2).

The cellular network 25 may have a number of different arrangements and may, for example, support wireless communication according to third generation (3G) standards, fourth generation (4G) standards (e.g., Long-Term Evolution (LTE)), or other wide area wireless communication standards or technologies. The cellular network 25 includes a plurality of cell sites/towers 45 that forward communications between different devices. For ease of illustration, only one cell site 45 is shown in FIG. 1. The mobile routers 20(1) and 20(2) each includes a wireless wide area network interface, referred to herein simply as interfaces 50(1) and 50(2), respectively, and at least one subscriber identification module (SIM) card 55(1) and 55(2), respectively, associated with a valid cellular account (i.e., a cellular activated account with a cellular service provider ("carrier"). The SIM cards 55(1)/55(2) and interfaces 50(1)/50(2) enable the mobile routers 20(1) and 20(2), respectively, to communicate over the cellular network 25. Because the mobile routers 20(1) and 20(2) have at least one SIM card with an active cellular account, the mobile routers 20(1) and 20(2) each have an assigned mobile directory number (MDN) (e.g., telephone number) to which cellular text and data messages can be sent. An MDN is associated at the time when the cellular account is activated. As described further below, the cellular account could potentially belong to the end user, the sender/manufacturer, etc.

Cellular networks, such as cellular network 25, support the exchange of cellular text and data messages. For example, cellular networks often support the Short Message Service (SMS) as well as the Multimedia Messaging Service (MMS). The SMS uses standardized communications protocols to allow devices to exchange short text messages. The MMS extends the core SMS capabilities in order to enable devices to exchange data messages (i.e., messages that include multimedia content such pictures, audio, video, rich text, etc.). The zero touch deployment techniques presented herein make use of cellular data messages, such as SMS messages, to send bootstrap configuration information to the mobile routers 20(1) and 20(2) to enable the mobile routers 20(1) and 20(2) to establish communication with a remote server (i.e., server 30) to obtain configuration data that enables mobile routers 20(1) and 20(2) to undertake self-configuration. For ease of description, further details of the zero touch deployment techniques are described with reference to mobile router 20(1) and the use of SMS messages. However, those skilled in the art will appreciate that MMS messages, as well as other message types, could also be employed.

The head-end system 15 is a provisioning system that generates and sends configuration data upon connection with each of the mobile routers 20(1) and 20(2). In one illustrative example, the head-end system 15 is a system associated with the purchasing or ordering of mobile router 20(1). When mobile router 20(1) is manufactured, ordered, shipped, etc., the server 30 generates configuration data 75 for mobile router 20(1). This configuration data 75 is stored in, e.g., table 70 that resides in configuration data database 40. Those skilled in the art will appreciate that another device, other than server 30, may store configuration data database 40.

Also stored in table 70 is a onetime password, the function of which will be described below. Still further stored in table 70 is the mobile directory number (MDN) of each of mobile routers 20(1) and 20(2). Thus, for example, the MDN of mobile router 1 (MR-1) may be used to send an SMS message to, e.g., mobile router 20(1). Further still, a router's serial number may also be stored. This will further bind a given router and its integrated SIM card.

The ZTD techniques described herein include programming of security credentials in the SIM card 55(1). The SIM card 55(1) is provided by an end-user or router vendor for the target platform equipped with a WWAN interface 50(1), such as a 3G/4G-LTE modem. The SIM card 55(1) has a security key 80 stored in the card, such as a pre-defined entry in the SIM card phone book. While use of the phone book is one possible implementation, those skilled in the art will appreciate that there are other possible areas in which to store the key 80 in the SIM card 55(1). The key 80 can be programmed by the end-user or router vendor before SIM card 55(1) is installed in the router 20(1).

In another possible implementation, if the phone book of the SIM card 55(1) is used as the key storage area, multiple entries in the phone book may be combined to increase the strength of the encryption key 80. For instance, it is possible to create a table over multiple entries that employ a hash algorithm to store/obtain the key 80.

Figure 2:
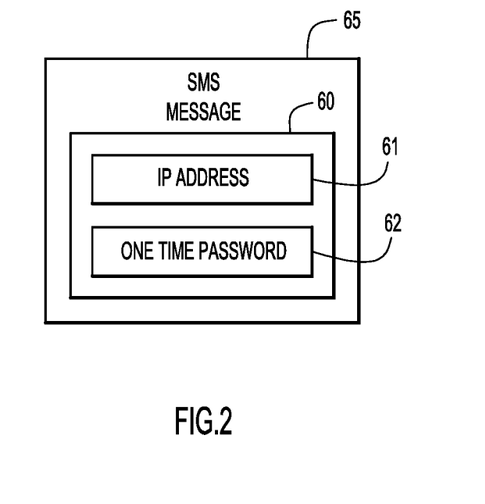
FIG. 2 depicts a short message service (SMS) message including a payload that enables a router to access a remote server to obtain configuration data, in accordance with an example embodiment.

In accordance with the described techniques, SMS message 65 contains payload 60 (i.e., the bootstrap configuration information), which is encrypted with the key 80. Payload 60, as shown in FIG. 2, includes, for example, two fields: an IP address 61 that enables connectivity with server 30 and onetime password 62. In some implementations, payload 60 may also be include CHV1 (Card Holder Verification) and CHV2 codes for added security. CHV1 and CHV2, unless unlocked make it impossible to access the phone book, or enable the SIM card to make a data connection to the 3G/4G-LTE network. The use of CHV1 and CHV2 are described in detail further below in connection with FIGS. 4A-5B.

ZTD agent 22(1) in router 20(1), upon detection of receipt of SMS message 65, reads encryption key 80 from the SIM card 55(1). ZTD agent 22(1) then accesses encrypted payload 60, and decrypts the payload 60 of the SMS message 65 using the key 80. Optionally, and if CHV1 is employed, that code is used to unlock the SIM card/modem data connection function.

As noted, the payload 60 contains bootstrap configuration information such as the destination IP address 61 of a PnP server, or SDN controller (i.e., a remote server 30). The payload 60 can also contain authentication credentials such as one time password 62, etc. for a "call home" server. This bootstrap configuration information is made available to the target platform, making it possible for the platform to establish a data connection over cellular network 25, via, e.g., router 66, and ultimately to a PnP server, SDN controller, etc. (i.e., a remote server 30). Thereafter, and after passing the authentication stage, the server or controller will provide full configuration data (e.g., the data stored in table 70) to mobile router 20(1) to enable mobile router 20(1) to self-configure. The remote server may also, through the established data connection, or a subsequent data connection, manage router 20(1).

As mentioned, payload 60 may also employ added security through the use of CHV1 and CHV2 codes. In one implementation CHV2 is sent in the clear, i.e., not encrypted by key 80, as CHV2 enables access to certain functions of a SIM card, including the phone book function. If CHV2 were encrypted, then ZTD agent 22(1) could not access the phone book to obtain the key with which the payload was encrypted. CHV1, on the other hand, which enables connectivity to cellular network 25, can be encrypted as part of payload 60.

Figure 3:
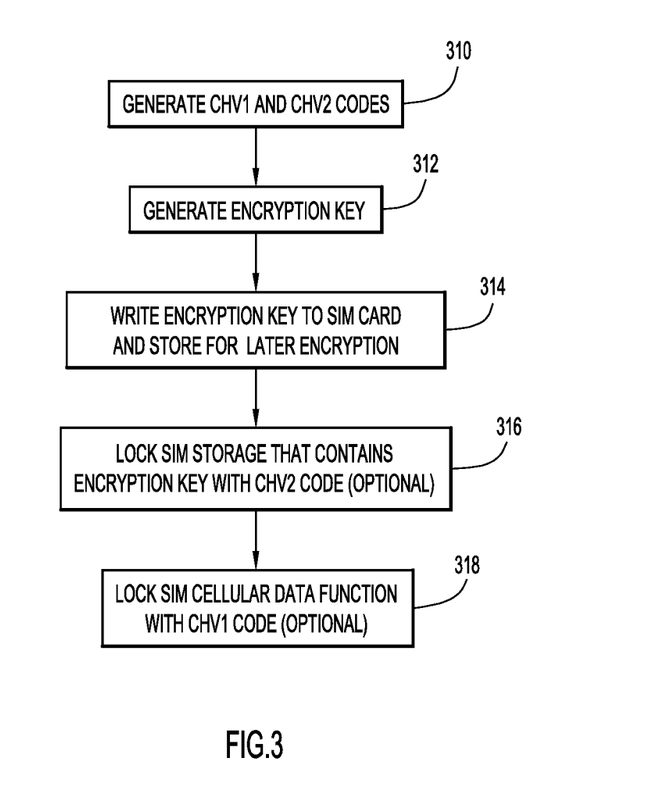
FIG. 3 is a flowchart of the setup of a subscriber identity module (SIM) card, in accordance with an example embodiment.

FIG. 3 is a flowchart of a series of operations 300 for the setup of a subscriber identity module (SIM) card, in accordance with an example embodiment. Programming of the SIM card in accordance with these particular operations is performed prior to installation in the router. At 310, and optionally, as previously indicated, CHV1 and CHV2 codes are generated. At 312, (a random) encryption key 80 is generated. At 314, encryption key 80 is written to the SIM card (e.g., its phone book), and is also stored for use to later encrypt the bootstrap configuration information (i.e., payload 60) that is sent via SMS message. At 316, and optionally, SIM card storage that contains the encryption key is locked with CHV2. And at 318, and optionally, the SIM card cellular data function is locked with a CHV1 code.

Figure 4A:
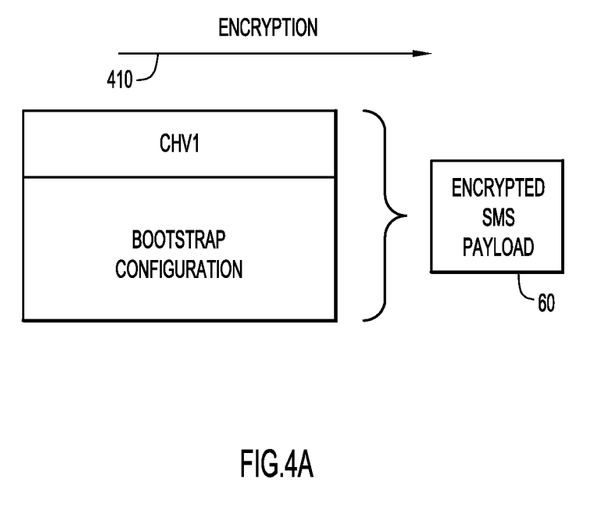
FIGS. 4A and 4B depict the use of a cardholder verification code (CHV1) with the SMS message, in accordance with an example embodiment.

FIGS. 4A and 4B depict the use of a cardholder verification code (CHV1) with the SMS message 65, in accordance with an example embodiment. As shown in FIG. 4A, the CHV1 code and the bootstrap configuration information are combined. This combination is encrypted, as indicated by arrow 410, using key 80 to obtain encrypted SMS payload 60. That encrypted payload is then sent via SMS (or MMS) to router 20(1). Notably, the SMS message may be sent even before a given router is shipped or powered on.

Figure 4B:
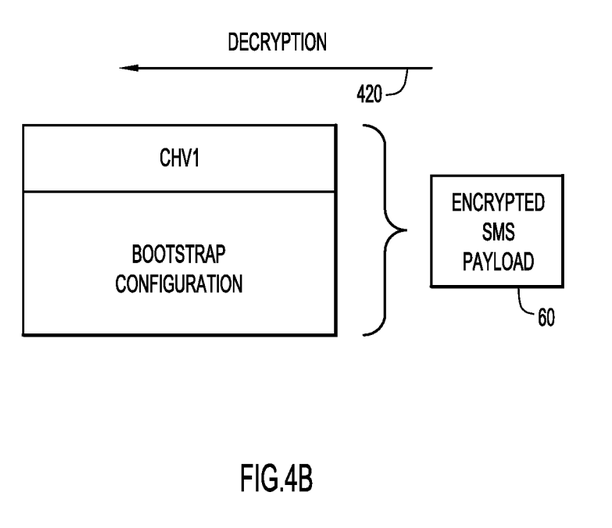

FIG. 4B shows the decryption process for a received SMS or MMS message. Specifically, the SMS or MMS is received and the encryption key 80 is read from the SIM card. Using the key 80, the payload 60 of the SMS message 65 is decrypted. Once decrypted the ZTD agent 22(1) reads the CHV1 code from the payload and submits that code for verification thereby enabling a data session via cellular service. If successful, then the bootstrap configuration information also now having been decrypted can also be employed to access the remote server and obtain the appropriate configuration data to enable mobile router 20(1) to self-configure. Arrow 420 indicates the decryption direction.

Figure 5A:
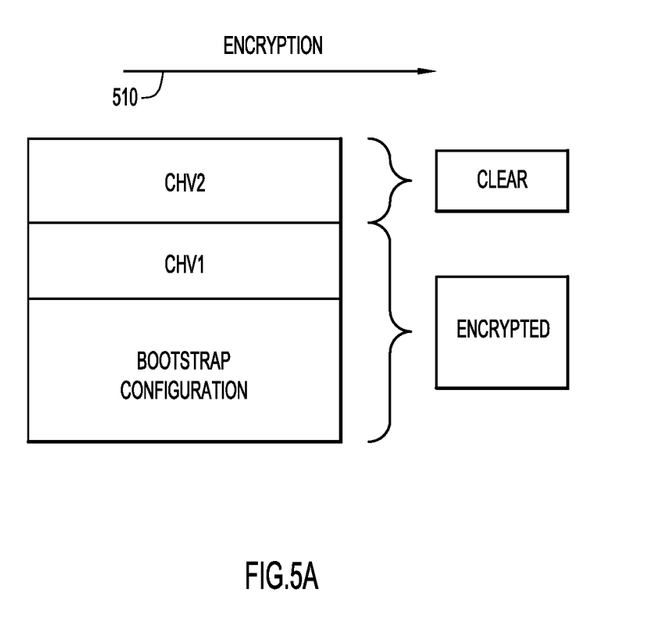
FIGS. 5A and 5B depict the use of a cardholder verification code (CHV2) with the SMS message, in accordance with an example embodiment.

FIGS. 5A and 5B depict the use of both a cardholder verification code (CHV2) and CHV1 code with the SMS message, in accordance with an example embodiment. As shown in FIG. 5A, the CHV1 code and the bootstrap configuration information are combined. This combination is encrypted, as indicated by arrow 510, using key 80 to obtain an encrypted portion 530 of SMS payload 60. CHV2 is then added to the encrypted portion, in the clear. CHV2 and the encrypted portion 530 of the payload are then sent via SMS (or MMS) to router 20(1).

Figure 5B:
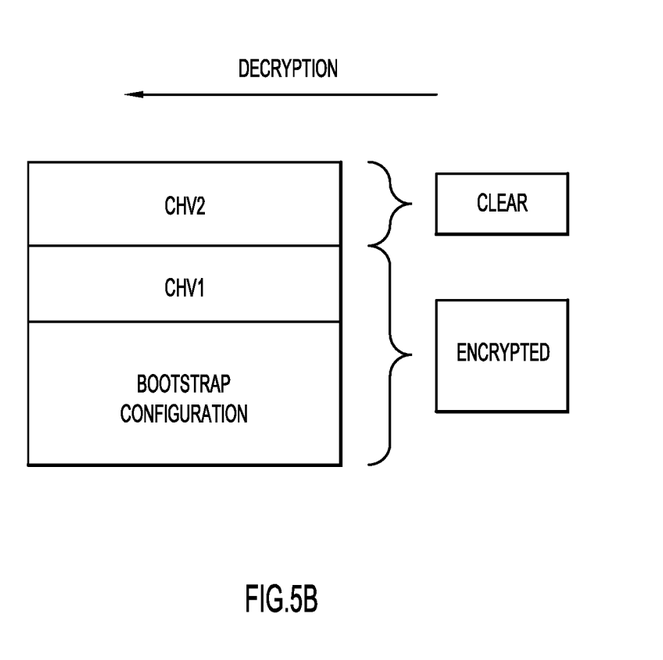

FIG. 5B shows the decryption process for a received SMS. Specifically, the SMS is received. CHV2 (which is in the clear) is read from the SMS message and confirmed against what is stored in the SIM card. If successful, the storage part of the SIM card (e.g., the phone book) becomes unlocked. In another implementation CHV2 on the SIM card can be submitted for verification. Once verified, ZTD agent can read the encryption key 80 from the phone book. Using the key 80, the encrypted portion 530 of payload 60 of the SMS message 65 is decrypted. Once decrypted the ZTD agent 22(1) reads the CHV1 code from the payload and submits that code for verification thereby unlocking cellular service (or such service is immediately unlocked). Assuming success, the bootstrap configuration information, also now having been decrypted, can also be employed to access the remote server and obtain the appropriate configuration data to enable mobile router 20(1) to self-configure. Arrow 520 indicates the reading/decryption direction.

Figure 6A:
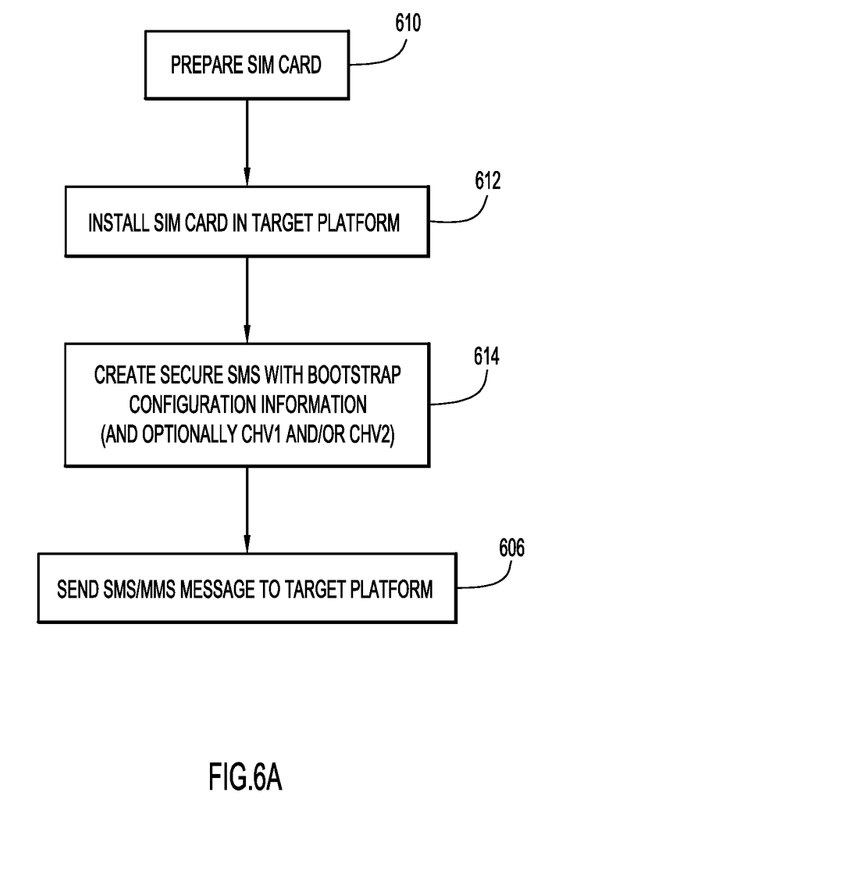
FIGS. 6A and 6B are flowcharts of the zero touch deployment techniques, in accordance with an example embodiment.

FIG. 6A is a flowchart of a portion of the zero touch deployment techniques, in accordance with an example embodiment. At 610, a SIM card is prepared. That SIM card is prepared by including an encryption key and, optionally, CHV1 and CHV2 codes. At 612, the prepared SIM card is installed in a target platform such as one of the mobile routers shown in FIG. 1. At 614, a secure SMS (or MMS) message with bootstrap configuration information is created using the key. The bootstrap information may include an IP address of a remote server that stores configuration data for the mobile router, and may further include a one time password for purposes of authentication. The SMS message might also optionally include CHV1 and/or CHV2 codes. At 616, the SMS message is sent to the target platform.

Figure 6B:
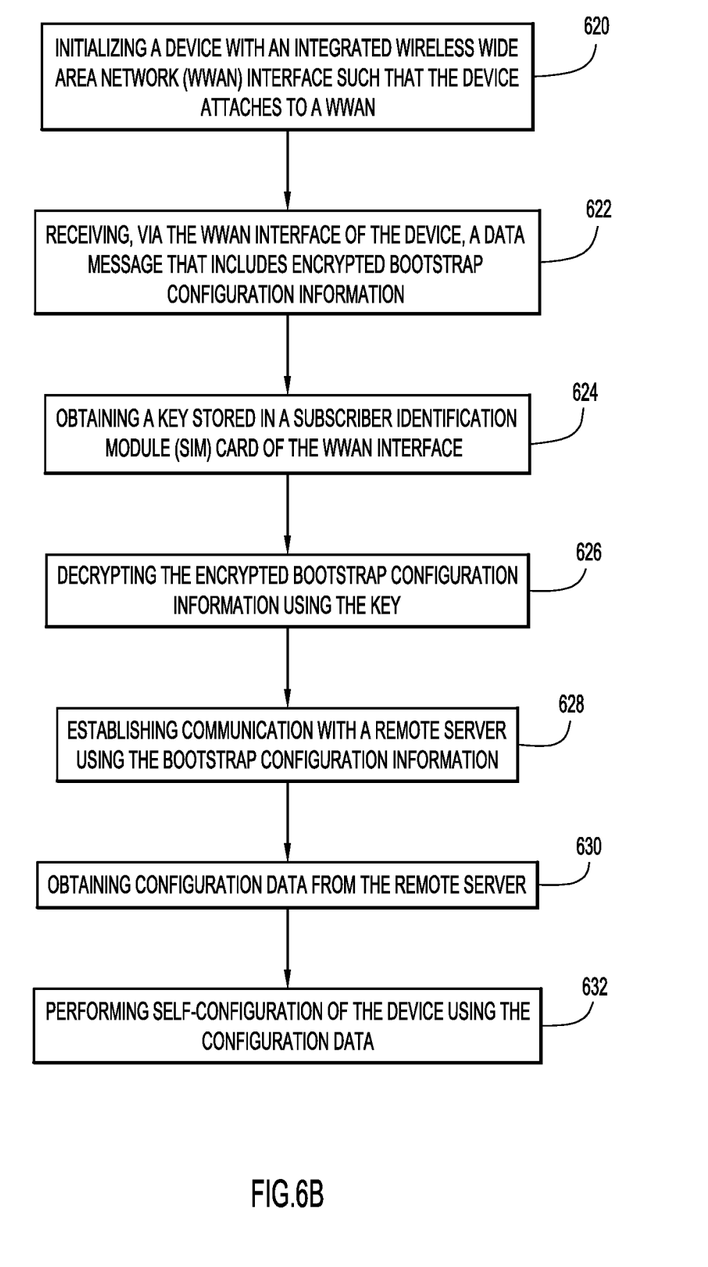

FIG. 6B is a flowchart of another portion of the zero touch deployment techniques, in accordance with an example embodiment. At 620, a device such as a target platform or mobile router having a wireless wide area network (WWAN) interface is initialized. Initialization may comprise, for example, powering on the device. At 622, a data message such as the sent SMS (or MMS) message is received at the target platform. That message includes encrypted bootstrap configuration information, such as an IP address and one time password. Upon receipt of the message, at 624, an encryption key stored in the SIM card of the WWAN interface is obtained. That encryption key was previously stored in the SIM card by the vendor or by a user or administrator of the target platform or mobile router.

At 626, the encrypted bootstrap configuration information is decrypted using the key. At 628, communication with a remote server is established using the decrypted bootstrap configuration information by, e.g., contacting the remote server using the IP address provided in the bootstrap information. At 630, as a result of the established communication, configuration data is obtained from the remote server, perhaps only after authentication using the one time password. At 632, self-configuration of the device or the mobile router is performed using the configuration data obtained from the remote server.

Several advantages flow from the zero touch deployment techniques described herein. For example, the described embodiments enable true zero touch deployment without connecting the router to any wired interfaces and pre-staging any configuration in the router prior to shipping it.

The end-user or router vendor does not need to program and store security certificates or authentication credentials in the target platform. Further, the SIM card can be programmed by the end user or vendor of the routers. Further still, multiple SIM cards can be bulk programmed before using them for target platforms, thus avoiding having to pre-stage each physical router with bootstrap configuration information.

In the described approach, precisely when a SIM card is programmed may only be known to a customer, hence, the described methodology is secure for an end-user in that another party (such as a router vendor) need not be involved in the process. This also makes it easier to manage a given target platform configuration for an end-user. Also, the SIM card itself has direct and secure connection to the cellular modem. It has a very high level of security of the information stored in it, based on smart card technologies.

Although ZTD can be accomplished using a regular SMS message in clear text, such an approach does not afford the same security afforded by the instant methodology, as clear text is susceptible to, e.g., man-in-the-middle attacks.

As an added level of security, unless the received message is processed correctly, the SIM card and modem data function will be locked with CHV1, making it impossible to establish a data connection over cellular network.

Also, if an attacker sends too many ZTD messages, and CHV1 is not correctly applied to unlock the data function, the SIM card will move to the blocked state, and can only be unblocked using PUK. This is yet another level of protection of a targeted system.

Finally, the payload of the SMS message may not incur any data plan usage charges.

Figure 7:
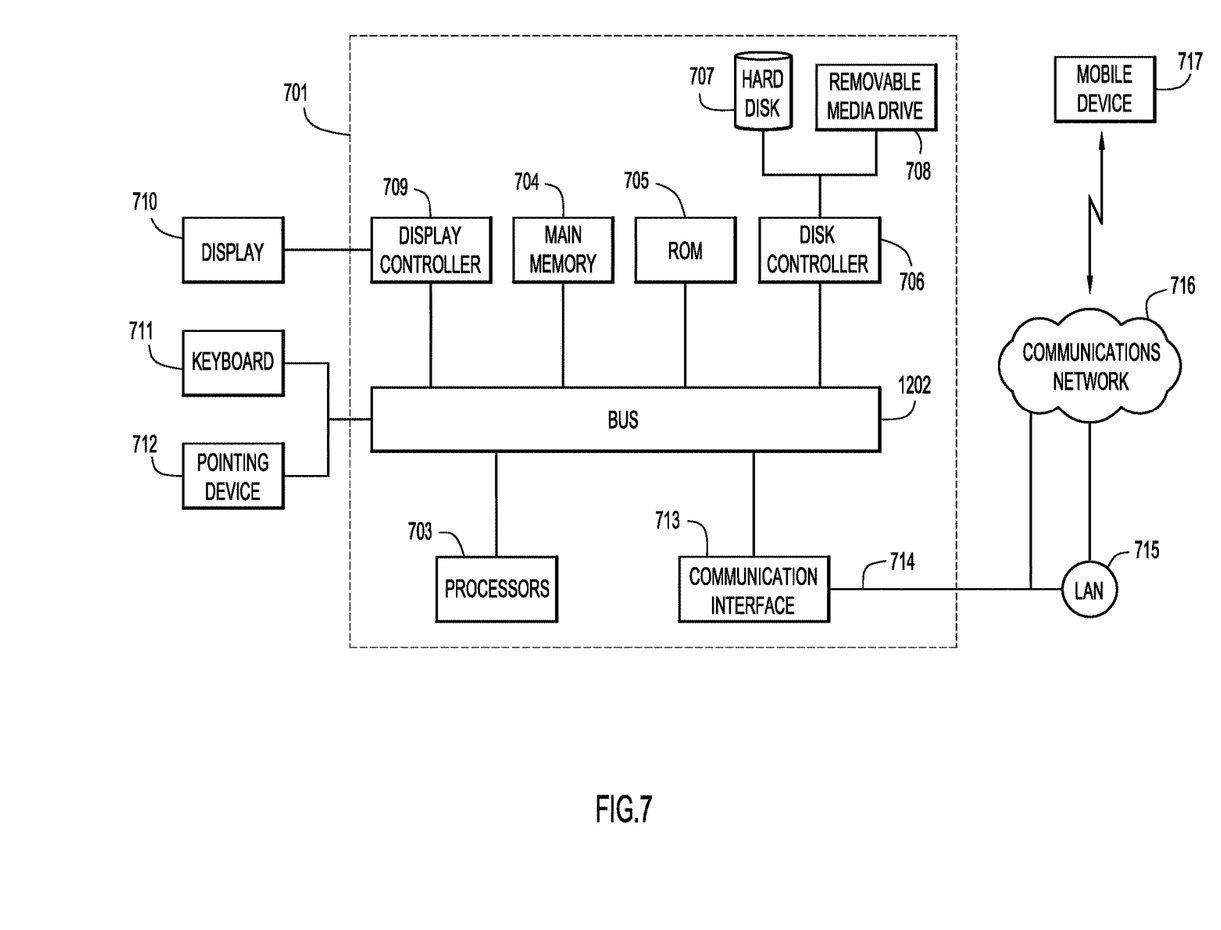
FIG. 7 is a schematic block diagram of a mobile router that executes the zero touch deployment techniques, in accordance with an example embodiment.

FIG. 7 depicts an apparatus that is configured to operate as a mobile router or remote server according to an example embodiment. The apparatus may be implemented on a computer system 701. The computer system 701 may be programmed to implement a computer based device. The computer system 701 includes a bus 702 or other communication mechanism for communicating information, and a processor 703 coupled with the bus 702 for processing the information. While the figure shows a single block 703 for a processor, it should be understood that the processor 703 represents a plurality of processors or processing cores, each of which can perform separate processing. The computer system 701 may also include a main memory 704, such as a random access memory (RAM) or other dynamic storage device (e.g., dynamic RAM (DRAM), static RAM (SRAM), and synchronous DRAM (SD RAM)), coupled to the bus 702 for storing information and instructions to be executed by processor 703. In addition, the main memory 704 may be used for storing temporary variables or other intermediate information during the execution of instructions by the processor 703. Main memory may also be used to store logic instructions or software for performing operations shown in FIGS. 3-6B.

The computer system 701 may further include a read only memory (ROM) 705 or other static storage device (e.g., programmable ROM (PROM), erasable PROM (EPROM), and electrically erasable PROM (EEPROM)) coupled to the bus 702 for storing static information and instructions for the processor 703.

The computer system 701 may also include a disk controller 706 coupled to the bus 702 to control one or more storage devices for storing information and instructions, such as a magnetic hard disk 707, and a removable media drive 708 (e.g., floppy disk drive, read-only compact disc drive, read/write compact disc drive, compact disc jukebox, tape drive, and removable magneto-optical drive). The storage devices may be added to the computer system 701 using an appropriate device interface (e.g., small computer system interface (SCSI), integrated device electronics (IDE), enhanced-IDE (E-IDE), direct memory access (DMA), or ultra-DMA).

The computer system 701 may also include special purpose logic devices (e.g., application specific integrated circuits (ASICs)) or configurable logic devices (e.g., simple programmable logic devices (SPLDs), complex programmable logic devices (CPLDs), and field programmable gate arrays (FPGAs)), that, in addition to microprocessors and digital signal processors may individually, or collectively, are types of processing circuitry. The processing circuitry may be located in one device or distributed across multiple devices.

The computer system 701 may also include a display controller 709 coupled to the bus 702 to control a display 710, such as a cathode ray tube (CRT) or liquid crystal display (LCD), for displaying information to a computer user. The computer system 701 may include input devices, such as a keyboard 711 and a pointing device 712, for interacting with a computer user and providing information to the processor 703. The pointing device 712, for example, may be a mouse, a trackball, or a pointing stick for communicating direction information and command selections to the processor 703 and for controlling cursor movement on the display 710. In addition, a printer may provide printed listings of data stored and/or generated by the computer system 701.

The computer system 701 performs a portion or all of the processing operations of the embodiments described herein in response to the processor 703 executing one or more sequences of one or more instructions contained in a memory, such as the main memory 704. Such instructions may be read into the main memory 704 from another computer readable medium, such as a hard disk 707 or a removable media drive 708. One or more processors in a multi-processing arrangement may also be employed to execute the sequences of instructions contained in main memory 704. In alternative embodiments, hard-wired circuitry may be used in place of or in combination with software instructions. Thus, embodiments are not limited to any specific combination of hardware circuitry and software.

As stated above, the computer system 701 includes at least one computer readable medium or memory for holding instructions programmed according to the embodiments presented, for containing data structures, tables, records, or other data described herein. Examples of computer readable media are compact discs, hard disks, floppy disks, tape, magneto-optical disks, PROMs (EPROM, EEPROM, flash EPROM), DRAM, SRAM, SD RAM, or any other magnetic medium, compact discs (e.g., CD-ROM), or any other optical medium, punch cards, paper tape, or other physical medium with patterns of holes, or any other medium from which a computer can read.

Stored on any one or on a combination of non-transitory computer readable storage media, embodiments presented herein include software for controlling the computer system 701, for driving a device or devices for implementing the described embodiments, and for enabling the computer system 701 to interact with a human user (e.g., print production personnel). Such software may include, but is not limited to, device drivers, operating systems, development tools, and applications software. Such computer readable storage media further includes a computer program product for performing all or a portion (if processing is distributed) of the processing presented herein.

The computer code may be any interpretable or executable code mechanism, including but not limited to scripts, interpretable programs, dynamic link libraries (DLLs), Java classes, and complete executable programs. Moreover, parts of the processing may be distributed for better performance, reliability, and/or cost.

The computer system 701 also includes a communication interface 713 coupled to the bus 702. The communication interface 713 provides a two-way data communication coupling to a network link 714 that is connected to, for example, a local area network (LAN) 715, or to another communications network 716, such as the cellular network 25 in FIG. 1. For example, the communication interface 713 may be a wired or wireless network interface card or modem (e.g., with SIM card) configured to attach to any packet switched (wired or wireless) LAN or WWAN. As another example, the communication interface 713 may be an asymmetrical digital subscriber line (ADSL) card, an integrated services digital network (ISDN) card or a modem to provide a data communication connection to a corresponding type of communications line. Wireless links may also be implemented. In any such implementation, the communication interface 713 sends and receives electrical, electromagnetic or optical signals that carry digital data streams representing various types of information.

The network link 714 typically provides data communication through one or more networks to other data devices. For example, the network link 714 may provide a connection to another computer through a local are network 715 (e.g., a LAN) or through equipment operated by a service provider, which provides communication services through a communications network 716. The local network 714 and the communications network 716 use, for example, electrical, electromagnetic, or optical signals that carry digital data streams, and the associated physical layer (e.g., CAT 5 cable, coaxial cable, optical fiber, etc.). The signals through the various networks and the signals on the network link 714 and through the communication interface 713, which carry the digital data to and from the computer system 701 may be implemented in baseband signals, or carrier wave based signals. The baseband signals convey the digital data as unmodulated electrical pulses that are descriptive of a stream of digital data bits, where the term "bits" is to be construed broadly to mean symbol, where each symbol conveys at least one or more information bits. The digital data may also be used to modulate a carrier wave, such as with amplitude, phase and/or frequency shift keyed signals that are propagated over a conductive media, or transmitted as electromagnetic waves through a propagation medium. Thus, the digital data may be sent as unmodulated baseband data through a "wired" communication channel and/or sent within a predetermined frequency band, different than baseband, by modulating a carrier wave. The computer system 701 can transmit and receive data, including program code, through the network(s) 715 and 716, the network link 714 and the communication interface 713. Moreover, the network link 714 may provide a connection to a mobile device 717 such as a personal digital assistant (PDA) laptop computer, cellular telephone, or modem and SIM card integrated with a given device.

In summary, in one form, a method is provided comprising: initializing a device with an integrated wireless wide area network (WWAN) interface such that the device attaches to a WWAN; receiving, via the WWAN interface of the device, a data message that includes encrypted bootstrap configuration information; obtaining a key stored in a subscriber identification module (SIM) card of the WWAN interface; decrypting the encrypted bootstrap configuration information using the key; establishing communication with a remote server using the bootstrap configuration information and obtaining configuration data from the remote server; and performing self-configuration of the device using the configuration data.

In another form, a device is provided comprising: a wireless wide area network (WWAN) interface; a memory, and a processor coupled to the memory and configured to: initialize the device with the WWAN interface such that the device attaches to a WWAN; receive, via the WWAN interface, a data message that includes encrypted bootstrap configuration information; obtain a key stored in a subscriber identification module (SIM) card of the WWAN interface; decrypt the encrypted bootstrap configuration information using the key; establish communication with a remote server using the bootstrap configuration information and obtain configuration data from the remote server; and perform self-configuration of the device using the configuration data.

Further still, in yet another form, one or more non-transitory computer readable storage media are provided encoded with software comprising computer executable instructions and when the software is executed operable to: initialize a device with an integrated wireless wide area network (WWAN) interface such that the device attaches to a WWAN; receive, via the WWAN interface of the device, a data message that includes encrypted bootstrap configuration information; obtain a key stored in a subscriber identification module (SIM) card of the WWAN interface; decrypt the encrypted bootstrap configuration information using the key; establish communication with a remote server using the bootstrap configuration information and obtain configuration data from the remote server; and perform self-configuration of the device using the configuration data.

The above description is intended by way of example only. Various modifications and structural changes may be made therein without departing from the scope of the concepts described herein and within the scope and range of equivalents of the claims.

What is claimed is:
1. A method comprising:
   initializing a device with an integrated wireless wide area network (WWAN) interface such that the device attaches to a WWAN;
   receiving, via the WWAN interface of the device, a data message that includes encrypted bootstrap configuration information;

obtaining a key stored in a phone book portion of a subscriber identification module (SIM) card of the WWAN interface;
decrypting the encrypted bootstrap configuration information using the key;
establishing communication with a remote server using the bootstrap configuration information and obtaining configuration data from the remote server; and
performing self-configuration of the device using the configuration data.

2. The method of claim 1, wherein initializing the device comprising powering on the device.

3. The method of claim 1, wherein receiving a data message comprises receiving a short message service (SMS) message that includes the encrypted bootstrap configuration information.

4. The method of claim 1, wherein establishing communication with the remote server comprises contacting the remote server at an internet protocol (IP) address provided in the bootstrap configuration information.

5. The method of claim 4, further comprising transmitting, to the remote server, a one time password provided in the bootstrap configuration information to authenticate the device.

6. The method of claim 1, further comprising decrypting, with the key, a card holder verification 1 (CHV1) code received in the data message to enable access to the remote server.

7. The method of claim 1, further comprising unlocking a storage portion of the SIM card using a card holder verification 2 (CHV2) code to enable access to the key stored in the (SIM) card.

8. The method of claim 1, further comprising obtaining the key from multiple entries in the phone book portion.

9. A device comprising:
a wireless wide area network (WWAN) interface;
a memory, and
a processor coupled to the memory and configured to:
initialize the device with the WWAN interface such that the device attaches to a WWAN;
receive, via the WWAN interface, a data message that includes encrypted bootstrap configuration information;
obtain a key stored in a phone book portion of a subscriber identification module (SIM) card of the WWAN interface;
decrypt the encrypted bootstrap configuration information using the key;
establish communication with a remote server using the bootstrap configuration information and obtain configuration data from the remote server; and
perform self-configuration of the device using the configuration data.

10. The device of claim 9, wherein the processor is configured to receive a short message service (SMS) message that includes the encrypted bootstrap configuration information.

11. The device of claim 9, wherein the processor is further configured to establish communication with the remote server by contacting the remote server at an internet protocol (IP) address provided in the bootstrap configuration information.

12. The device of claim 11, wherein the processor is further configured to transmit, to the remote server, a one time password provided in the bootstrap configuration information to authenticate the device.

13. The device of claim 9, wherein the processor is further configured to decrypt, with the key, a card holder verification 1 (CHV1) code received in the data message to enable access to the remote server.

14. The device of claim 9, wherein the processor is further configured to unlock a storage portion of the SIM card using a card holder verification 2 (CHV2) code to enable access to the key stored in the (SIM) card.

15. The device of claim 9, wherein the processor is configured to obtain the key from multiple entries in the phone book portion.

16. One or more non-transitory computer readable storage media encoded with software comprising computer executable instructions and when the software is executed operable to:
initialize a device with an integrated wireless wide area network (WWAN) interface such that the device attaches to a WWAN;
receive, via the WWAN interface of the device, a data message that includes encrypted bootstrap configuration information;
obtain a key stored in a phone book portion of a subscriber identification module (SIM) card of the WWAN interface;
decrypt the encrypted bootstrap configuration information using the key;
establish communication with a remote server using the bootstrap configuration information and obtain configuration data from the remote server; and
perform self-configuration of the device using the configuration data.

17. The non-transitory computer readable storage media of claim 16, wherein the instructions operable to receive a data message comprise instructions to receive a short message service (SMS) message that includes the encrypted bootstrap configuration information.

18. The non-transitory computer readable storage media of claim 16, wherein the instructions operable to establish communication with the remote server comprise instructions to contact the remote server at an internet protocol (IP) address provided in the bootstrap configuration information.

19. The non-transitory computer readable storage media of claim 16, wherein the instructions are further operable to transmit, to the remote server, a one time password provided in the bootstrap configuration information to authenticate the device.

20. The non-transitory computer readable storage media of claim 16, wherein the instructions are further operable to obtain the key from multiple entries in the phone book portion.

* * * * *